Feb. 19, 1952 H. WOCHNER 2,586,194
MEASURING HEAD FOR AUTOMOTIVE WHEEL ALIGNMENT GAUGES
Filed Oct. 25, 1946 3 Sheets-Sheet 3

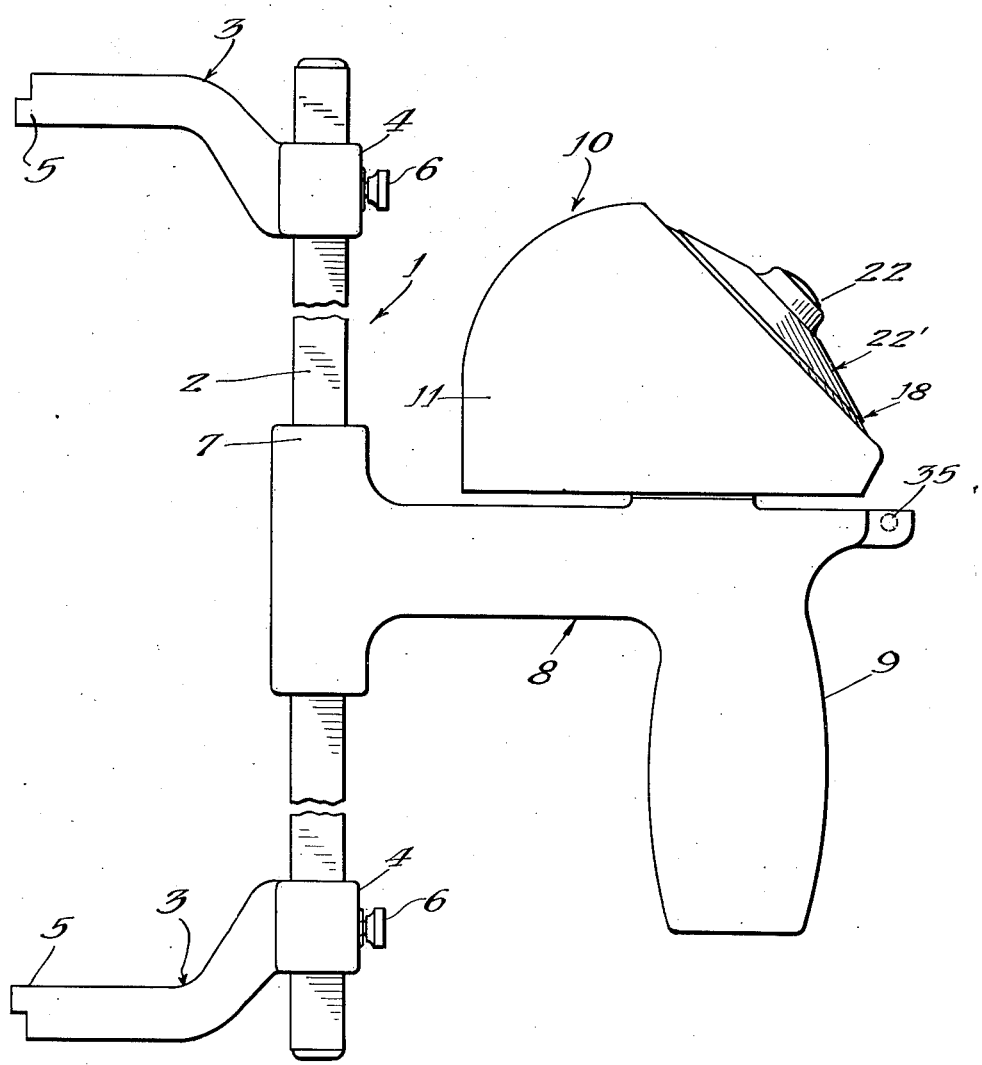

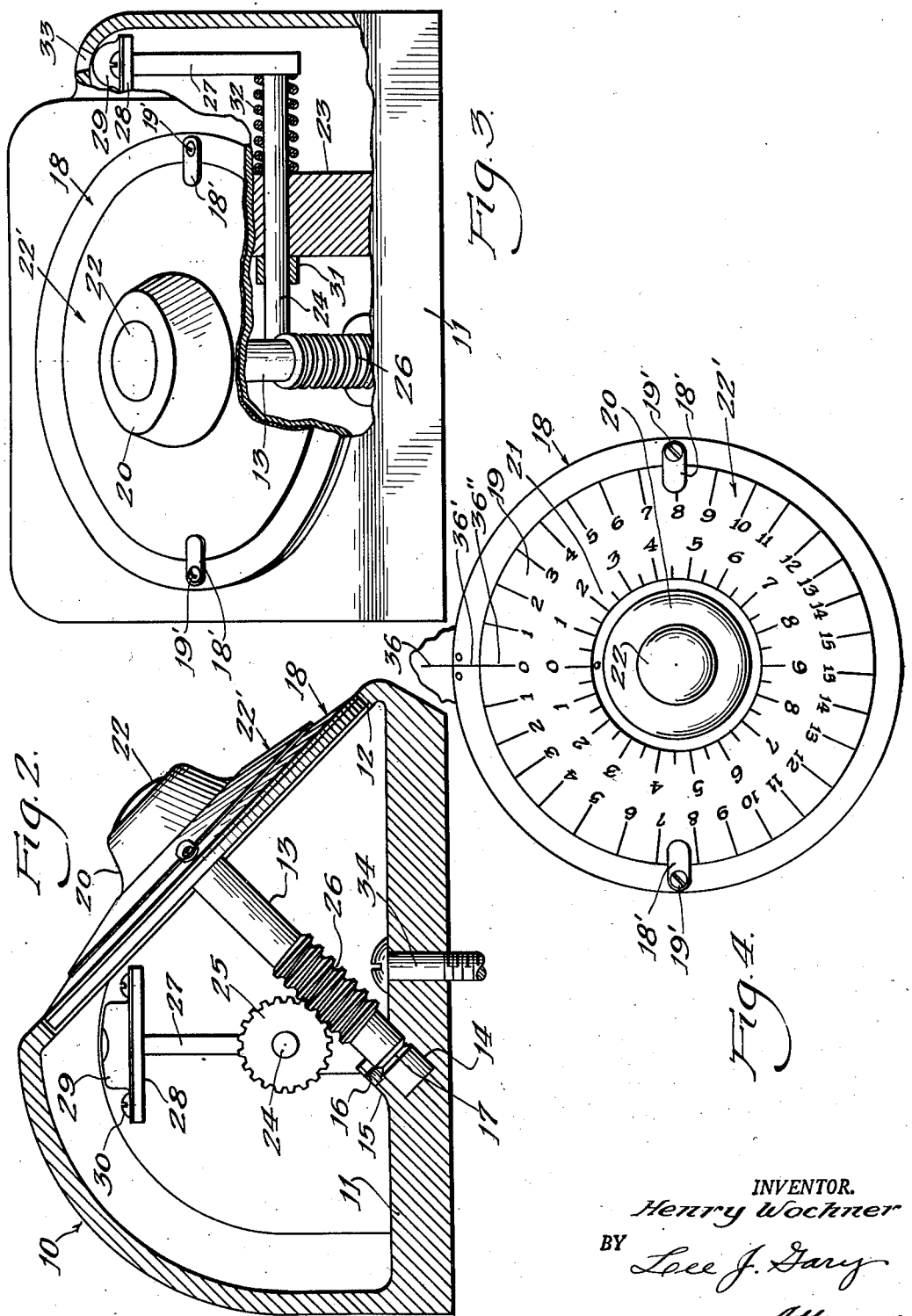

INVENTOR.
Henry Wochner
BY Lee J. Gary
Attorney

Patented Feb. 19, 1952

2,586,194

UNITED STATES PATENT OFFICE 2,586,194

MEASURING HEAD FOR AUTOMOTIVE WHEEL ALIGNMENT GAUGES

Henry Wochner, Rock Island, Ill., assignor to Bear Manufacturing Company, Rock Island, Ill., a corporation of Delaware Application October 25, 1946, Serial No. 705,651

2 Claims. (Cl. 33—203)

This invention relates to improvements in a wheel alignment gauge for automobile wheels, and refers specifically to a gauge with which the alignment angles of caster, camber, kingpin inclination and the like can be measured quickly, conveniently and accurately.

One of the objects of the present invention resides in the provision of a measuring head in combination with a wheel alignment gauge which can be conveniently manipulated and upon which angles can be measured to a fraction of a degree, the measuring mechanism being such that it cannot be easily thrown out of adjustment.

Other objects and advantages of my invention will be apparent from the accompanying drawings and following detailed description.

In the drawings:

Fig. 1 is an elevational view of a wheel alignment gauge made in accordance with the concepts of my invention.

Fig. 2 is a sectional elevational view of the measuring head utilized in conjunction with the wheel alignment gauge.

Fig. 3 is a front elevational view, parts being broken away and parts being shown in section, of the measuring head illustrated in Fig. 2.

Fig. 4 is a face view of the calibrated dial employed in conjunction with the measuring head.

Figure 5:
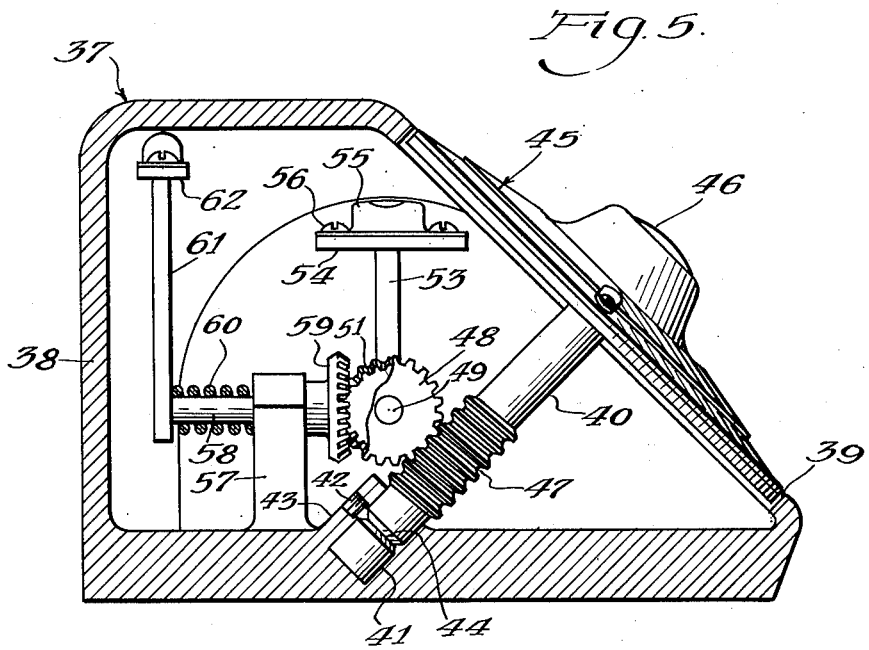
Fig. 5 is a sectional elevational view of a modified form of measuring head.

In the usual wheeled vehicle such as an automobile, certain angular relationships of the front wheels obtain. These angular relationships are generally known as the steering geometry of the vehicle.

Among the angular relationships which are considered in order to produce a more efficient support for the load carried by the front wheels, and in order to facilitate steering and control of the front wheels, are the angles of caster, camber, and kingpin inclination.

Caster is the backward tilt of the front axle whereby the kingpins are so inclined that they are further backward at the top than at the bottom. The purpose of caster is to assist in the "tracting" of the vehicle, that is, to cause the front wheels of the vehicle to move in a direction parallel to the longitudinal axis of the vehicle or in a straight ahead direction.

Camber comprises the outward sloping of the front wheels at the top such that the distance between the tops of the front wheels is greater than the distance between the bottoms of said wheels. The purpose of this relationship is to bring the road contact of the wheels under the point of the load.

Referring particularly to the drawing, 1 indicates generally a gauge which may be conveniently employed to measure the angles of caster, camber and kingpin inclination. The device 1 comprises a bar 2 which is preferably of square cross-section and of hollow construction. The bar 2 is preferably constructed of steel, iron or other metallic material. A pair of wheel arms 3 are positioned on the bar 2, the arms comprising a hollow square sectioned collar 4 at one end, and a rim-contacting portion 5 at the opposite end. The arms 3 are adjustable along the length of the bar 2 and may be removably fixed in any desired position along the length of the bar by means of set screws 6.

The bar 2 is rigidly secured intermediate its length to a collar 7 which comprises a portion of handle 8. The handle 8 also comprises a hand-gripping member 9 and said handle is adapted to carry at its upper portion a measuring head 10.

The measuring head 10 (Figs. 2, 3 and 4) comprises a housing 11 having a hollow interior and being provided with a circular opening 12. A shaft 13 is positioned in said housing and projects in an angular direction toward the central portion of the opening 12. The lower portion of the shaft 13 is retained in a socket 14 which is provided in the bottom wall of the housing. A projection 15 extends upwardly from the bottom wall of the housing adjacent the socket 14, said projection carrying a set screw 16 which is threadedly positioned in the projection. The lower portion of shaft 13 is provided with an annular groove 17 into which the set screw 16 projects. In this manner the shaft 13 is journalled in the housing, being free to rotate in the socket 14 but having its longitudinal motion restricted by the set screw 16.

A circular dial 18 is adapted to be carried at the opposite end of the shaft 13 and is secured to said shaft by means of screw 22, said dial fitting within the circular opening 12 and, in effect, providing a closure for the housing 11. A scale ring 22' is carried upon the dial 18 and is removably secured thereto by means of fingers 18' which, in turn, are anchored by means of screws 19' upon the dial 18. When the fingers 18' overlap the scale ring 22' and the screws 19' are tightened, the dial and scale ring can be rotated as a unit by means of knob 20 forming a part of the dial 18. When the screws 19' are loosened and the fingers 18' disengaged from the face of the scale ring, the dial and scale ring may be rotated relative to each other. Calibrated indicia is provided upon the face of the scale ring 22' adjacent its outer periphery forming a scale 19, and calibrated indicia is also provided upon the face of said ring adjacent its inner periphery forming scale 21. The function of the dial and scale ring will be hereinafter more fully described.

A support 23 is positioned upon the lower wall of the housing 11 and extends upwardly into the interior of said housing. A shaft 24 is journalled in the support 23 and carries at one end a worm wheel 25. The shaft 13 carries intermediate its length worm 26 which operatively engages the worm wheel 25 to provide a worm gear.

At the opposite end of shaft 24, an arm 27 is carried which, in turn, supports a platform 28. A spirit level 29 is mounted upon the platform 28 by means of screws 30. A collar 31 is positioned upon shaft 24 on one side of the block 23 and on the opposite side of said block a coil spring 32 embraces shaft 24 whereby worm wheel 25 is maintained in operative position with respect to worm 26.

The housing 11 is provided with an opening 33 which may take the form of an elongated slot. That portion of the housing 11 in which the slot 33 is provided, conforms in curvature to the path of travel of the spirit level 29 when the arm 27 is rotated by shaft 24 whereby the spirit level may be observed exteriorly of the housing.

The arrangement is such that when the housing is in a substantially horizontal position, that is, the position shown in Figs. 1, 2 and 3, and the arm 27 is in a substantially vertical position, the bubble (not shown) of the spirit level will be centered within said level. This position is hereinafter referred to as its normal position. If the housing is canted about an axis parallel to the shaft 24, the bubble of the spirit level, obviously, will be removed from its central position. By manipulation of the dial 18, shaft 13 may be rotated which in turn rotates wheel 25 and shaft 24, thereby rocking arm 27. By rocking the arm 27 in the proper direction, the bubble of the spirit level may be brought back to its central position as ascertained by observation through the slot 33.

When the device is in its normal position, as hereinbefore described, index line 36 inscribed upon housing 11, index line 36' inscribed upon dial 18 and index line 36" corresponding to the zero positions of scales 19 and 21, are all in coincidence. The relationship of dial 18 and housing 11 is a permanent one, but, as will be hereinafter more fully described, scale ring 22' may be moved from its normal position when caster is measured.

The measuring head 10 is mounted upon the upper portion of handle 8 by means of a screw 34, the arrangement being such that the head may be rotated in a horizontal plane about the screw 34 as an axis. As will be hereinafter more fully described, the rotation of the head 10 to a position at right angles to the position illustrated in Fig. 1, permits the device to be employed in conveniently measuring kingpin inclination.

In utilizing my gauge to measure caster, the brakes of the vehicle are locked and the front of the front wheel to be measured is turned from a "straight ahead" position toward the centerline of the vehicle through an angle of 20°. With the indexes 36, 36' and 36" in registration, the gauge is positioned adjacent the wheel with the contacting portions 5 of the wheel arms 3 in contact with the wheel rim, and with the bar 2 disposed in a vertical plane at right angles to the plane of the wheel. The bar 2 may be brought to this position by observation of a spirit level 35 which is positioned upon handle 8 with its longitudinal axis disposed in a substantially horizontal plane, as viewed in Fig. 1. The bar 2 in all probability will not be disposed at right angles to the ground and, hence, the dial 18 is rotated until the bubble of the spirit level 29 is brought to its central position, as observed through slot 33. The indexes 36' and 36" will then be out of register with index 36. Screws 19' are then loosened and fingers 18' are so manipulated as to permit the rotation of the scale ring 22' relative to the dial 18 and said ring is rotated to bring the index 36" into registration with index 36. With the parts in this position the screws 19' are tightened to lock the scale ring and dial together.

The wheel being measured is then turned back through the "straight ahead" position and through an angle of 20° in an outwardly direction with respect to the centerline of the vehicle, and with the bar 2 in a vertical plane at right angles to the plane of the wheel, as indicated by the spirit level 33, the dial is turned until the bubble in spirit level 29 is again centered. The amount of caster in degrees is then read directly on scale 19 opposite index 36.

To measure camber the dial 18 is set at zero, that is, with the indexes 36, 36' and 36" in alignment, and the gauge is placed against the rim of the wheel to be measured. The gauge is positioned in a vertical plane as indicated by the level 35 and the dial is turned until the level 29 as seen through slot 33 is centered. The amount of camber is read directly on the scale 21.

To measure the kingpin inclination the head 10 is turned 90° from the position shown in Fig. 1 about the pivot 34. The dial 18 is adjusted to zero. With the brakes locked the front of the wheel to be measured is turned outwardly from the "straight ahead" position 25°. The gauge is placed against the rim of the wheel in a vertical position as shown by the level 35.

The position of the wheel arms with the gauge so adjusted is indicated upon the rim of the wheel by inscribing a chalk mark or the like at the positions where the contacting portions 5 touch the rim. The wheel is then turned back through the "straight ahead" position to an angle of 25° and the gauge is placed on contact with the rim with the contacting portions 5 positioned at the marks previously made. The dial 18 is then manipulated until the bubble in the spirit level 29 is brought to its central position. The kingpin inclination in degrees is then read directly on the scale 21 opposite index 36.

Figure 6:
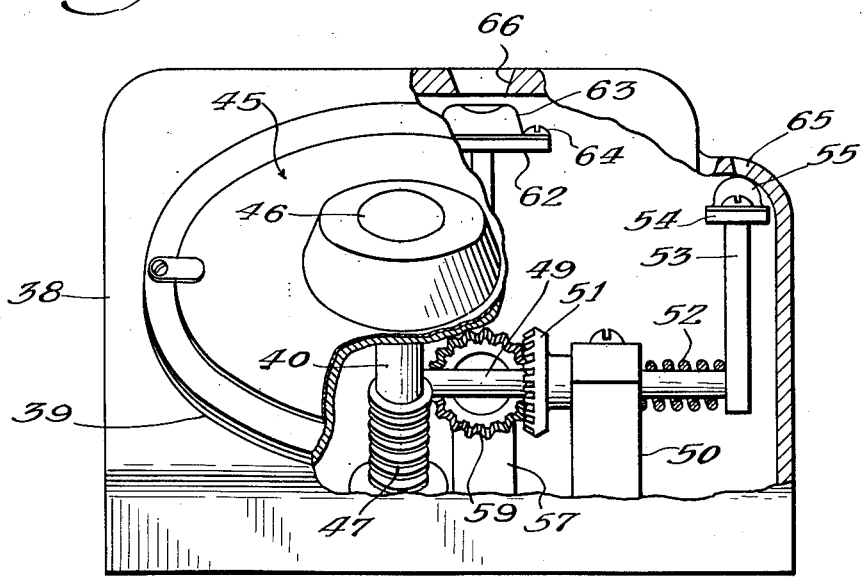
Fig. 6 is a front elevational view of the head shown in Fig. 5, parts being broken away and parts being shown in section.

Referring particularly to Figs. 5 and 6, a slightly modified measuring head 37 is shown. The head 37 comprises a casing 38 provided with a circular opening 39. A shaft 40 is journalled at its lower end in a socket 41 provided in the bottom wall of the casing. A set screw 42 is threadedly positioned in a projection 43 formed upon the lower wall of the casing. Shaft 40 is provided with an annular groove 44 into which the set screw 42 is adapted to be positioned whereby to permit rotatable movement of the shaft 40 and prevent axial movement thereof. A dial 45 is carried at the opposite end of the shaft 40, said dial being identical with the dial 18 hereinbefore described and having a scale ring mounted thereon similar to scale ring 22'. The dial 45 is secured to the end of the shaft 40 by means of a screw or the like 46 which may be tightened to cause the dial and shaft to move as a unit. Similar to the dial 18, the dial 45 comprises, in effect, a closure for the opening 39.

A worm 47 is carried intermediate the length of shaft 40 and is adapted to engage with a worm wheel 48 mounted upon shaft 49, which in turn is journalled intermediate its length upon standard 50 mounted within the casing 38. A bevel gear 51 is positioned upon shaft 49 adjacent one side of standard 50 and a coil spring 52 embraces shaft 49 adjacent the opposite side of said standard whereby to prevent axial movement of the shaft 49. An arm 53 is carried upon the end of shaft 49 and support 54 is mounted upon the upper portion of said arm. The support 54 is adapted to carry a spirit level 55 which is secured to said support by means of screws or the like 56.

A second standard 57 is positioned within the casing 38 and serves as a bearing for shaft 58. A bevel gear 59 is positioned upon shaft 58 adjacent one side of the standard 57 and a coil spring 60 embraces shaft 58 adjacent the opposite side of the standard 57 whereby axial movement of the shaft 58 is prevented. The bevel gear 59 meshes with bevel gear 51 whereby both shafts 49 and 58 move in unison. An arm 61 is carried at the end of shaft 58 and a support 62 is mounted upon the upper end of said arm. The spirit level 63 is mounted upon the upper portion of support 62 and is secured thereto by means of screws 64 or the like.

An opening 65 is provided in the casing 38 adjacent the path of travel of the spirit level 55 whereby the bubble (not shown) of said spirit level may be observed exteriorly of the casing. Similarly an opening 66 is provided in the casing adjacent the path of travel of spirit level 63 whereby the bubble in said level may also be observed.

The measuring head 37 is adapted to be utilized in conjunction with the gauge 1 and is positionable upon the handle 8. As will be hereinafter more fully described, it is not necessary for the measuring head 37 to be rotated in order to measure kingpin inclination of the wheels of an automotive vehicle as was the case with the measuring head 10. Consequently, the head 37 is mounted upon the handle 8 in a fixed relationship with respect to said handle, the head 37 being positioned upon the handle with the relative parts thereof in the same location as is the case with the head 10 as viewed in Fig. 1.

The measuring caster and camber, the mechanism comprising the measuring head 37 is manipulated in conjunction with the remaining instrumentalities of the gauge 1 in a manner similar to that hereinbefore described in conjunction with the use of the measuring head 10. When measuring these two geometric relationships, the movement of the dial 45 is correlated with respect to the position of the bubble in the spirit level 55.

However, when kingpin inclination is to be measured, it is not necessary to rotate the head 37 with respect to the remaining instrumentalities comprising the gauge 1 as was the case when the head 10 was used. To measure kingpin inclination using the head 37, the various steps hereinbefore described are followed in making such measurement with the exception that the readings upon the dial 45 are correlated with respect to the position of the bubble in the spirit level 63. It will be noted that when the head 37 is in its normal position, the spirit level 63 will be in the same relative position as was the spirit level 29 when the head was rotated at 90° to the position illustrated in Fig. 1.

It will be seen that herein is provided a gauge for measuring various of the "steering angles" of an automotive vehicle's wheels which is rugged and strong, the operative mechanism being completely enclosed so as to minimize the possibility of breakage of the delicate spirit levels used with such devices, and tending toward the prevention of the mechanism being thrown out of adjustment. In addition, a gauge is provided wherein a relatively large space is provided for each degree on the scale. Although worm gears are shown and described, it is to be understood that other type gear, sprocket, or cable reducing mechanism can be employed without departing from the fundamental concept of my invention.

I claim as my invention:

1. In combination with an automobile wheel alignment gauge of the type having a handle, a bar carried by said handle and wheel arms carried by said bar for contacting portions of an automobile wheel, of a spirit level carried by said handle with its axis at substantially right angles to the plane of said bar and said wheel arms, a measuring head carried by said handle comprising a housing, a shaft rotatably carried in said housing, a dial carried upon said shaft, an index carried by said housing, a scale ring carried by said dial and movable relative thereto, means upon said dial for securing the dial and scale ring together as a unit, calibrated indicia carried on said scale ring and readable exteriorly of said housing, a worm carried by said shaft within said housing, a rockable spirit level support comprising a worm wheel engageable with said worm, said support being rockable in a plane substantially parallel to the plane of said bar and said wheel arms, a spirit level carried upon said support whereby rotation of said dial rocks said spirit level in a plane substantially parallel to the plane of said bar and said wheel arms.

2. In combination with an automobile wheel alignment gauge of the type having a handle, a bar carried by said handle, and wheel arms carried by said bar for contacting portions of an automobile wheel, of a spirit level carried by said handle with its axis at substantially right angles to the plane of said bar and said wheel arms, a measuring head carried by said handle comprising a housing having an opening, a shaft rotatably mounted in said housing, a dial carried upon said shaft and comprising a closure for said opening, calibrated indicia carried upon said dial, a spirit level mounted in said housing and tiltable in a plane parallel to the plane of the bar, and means connecting said shaft and said tiltably mounted spirit level whereby said spirit level is tilted by rotation of said dial.

HENRY WOCHNER.

REFERENCES CITED

The following references are of record in the file of this patent:

UNITED STATES PATENTS

| Number | Name | Date |
|---|---|---|
| 1,931,490 | Fisher | Oct. 24, 1933 |
| 2,206,817 | Mann | July 2, 1940 |
| 2,207,410 | O'Keefe | July 9, 1940 |
| 2,235,321 | Krumm | Mar. 18, 1941 |

FOREIGN PATENTS

| Number | Country | Date |
|---|---|---|
| 11,094 | Great Britain | 1905 |
| 317,275 | Germany | Dec. 13, 1919 |